US007981853B2

(12) United States Patent
Schultz et al.

(10) Patent No.: US 7,981,853 B2
(45) Date of Patent: Jul. 19, 2011

(54) SPRAYABLE WASH-AND-WAX COMPOSITION

(75) Inventors: Michael A. Schultz, Homer Glen, IL (US); Frederic W. Joseph, II, Orland Park, IL (US); Michael A. Deddo, Oak Brook Terrace, IL (US)

(73) Assignee: Turtle Wax, Inc., Willowbrook, IL (US)

( * ) Notice: Subject to any disclaimer, the term of this patent is extended or adjusted under 35 U.S.C. 154(b) by 108 days.

(21) Appl. No.: 12/448,534

(22) PCT Filed: Dec. 20, 2007

(86) PCT No.: PCT/US2007/026058
§ 371 (c)(1),
(2), (4) Date: Jun. 24, 2009

(87) PCT Pub. No.: WO2008/085382
PCT Pub. Date: Jul. 17, 2008

(65) Prior Publication Data
US 2010/0087354 A1    Apr. 8, 2010

Related U.S. Application Data

(60) Provisional application No. 60/877,494, filed on Dec. 28, 2006.

(51) Int. Cl.
*C11D 17/00*    (2006.01)

(52) U.S. Cl. ........ 510/189; 510/202; 510/208; 510/211; 510/212

(58) Field of Classification Search ........................ None
See application file for complete search history.

(56) References Cited

U.S. PATENT DOCUMENTS 6,506,715 B1 * 1/2003 Schultz et al. ................. 510/189
6,669,763 B1 * 12/2003 Ghodoussi ....................... 106/10

* cited by examiner

*Primary Examiner* — Necholus Ogden, Jr.
(74) *Attorney, Agent, or Firm* — Olson & Cepuritis, Ltd.

(57) ABSTRACT

A sprayable wash-and-wax composition which includes biodegradable surfactants and water repelling sealants. The sprayable composition preferably is packaged in an aerosol can and is dispensed as a foamed composition onto the car surface to be clean. The foamed composition is thereafter wiped from the car surface to produce a cleaned surface which is then buffed to a high gloss.

14 Claims, No Drawings

SPRAYABLE WASH-AND-WAX COMPOSITION

CROSS-REFERENCE TO RELATED APPLICATION

This application claims the benefit of U.S. Provisional Application No. 60/877,494, filed Dec. 28, 2006, which is incorporated by reference.

FIELD OF THE INVENTION

This invention relates to car care products.

BACKGROUND OF THE INVENTION

Most conventional car wash products must be diluted prior to use and necessarily require a container such as a bucket when needed to wash a car.

Conventional car wash products also do not provide a protective barrier for the car finish nor contain lubricants to minimize the likelihood of scratching the finish during the washing process. The present invention overcomes the shortcomings of conventional car wash products.

SUMMARY OF THE INVENTION

Car wash compositions embodying the present invention provide excellent lubrication during the washing process and deposit a durable, monomolecular protective coating on the car's finish. The present car wash compositions are sprayable, and can be used on glass as well as clear plastic, and do not cause streaking on windshields. The present compositions are a blend of biodegradable surfactants and water repelling sealants.

In particular, the present sprayable compositions comprise an aqueous emulsion that includes a saturated fatty acid such as stearic acid, a water miscible lower aliphatic secondary amine such as morpholine, a high viscosity silicone fluid, a standard viscosity silicone fluid, a hydrocarbon fluid, a wax and a biodegradable anionic surfactant. Optionally, the present compositions can include a microbiostat, a fragrance, a dye, and a propellant. These compositions can be packaged as aerosol sprays, in a pump spray container, and the like.

A preferred high viscosity silicone fluid is a polydimethylsiloxane having a viscosity of about 10,000 centistokes (CTSK) at 25° C.

A preferred standard viscosity silicone fluid is a polydimethylsiloxane having a viscosity of about 350 centistokes at 25° C.

A preferred lower aliphatic secondary amine is morpholine.

A preferred hydrocarbon fluid is a paraffin-based hydrocarbon fluid having a specific gravity of about 0.749 at 15.6° C. (ASTM D 4052), a flash point of about 69° C. (ASTM D 93A), and aniline point of about 83° C. (ASTM D 611). A preferred wax is carnauba wax, preferably in the form of an anionic carnauba wax emulsion, such as MICHEM® Emulsion 62125.

A preferred biodegradable surfactant is an anionic acylamino surfactant salt, preferably a N-acylsarcosinate such as sodium N-lauroyl sarcosinate, typically supplied as about 30% active solution.

A preferred microbiostat is 1,2-benzoisothiazolin-3-one, commercially available as a 19% active solution. Other microbiostats or microbiocides can be used as well, if desired.

DETAILED DESCRIPTION OF A PREFERRED EMBODIMENT

In the present sprayable compositions the water miscible lower aliphatic secondary amine is present in an amount in the range of about 0.01 to about 0.2 parts by weight, preferably about 0.07 parts by weight, of the composition, the high viscosity silicone fluid is present in an amount in the range of about 0.01 to about 0.1 parts by weight, preferably about 0.08 parts by weight, of the composition, the standard viscosity silicone fluid is present in an amount in the range of about 0.01 to about 5 parts by weight, preferably about 0.25 parts by weight, of the composition, the hydrocarbon fluid is present in an amount in the range of about 0.25 to about 10 parts by weight, preferably about 1.33 parts by weight, of the composition, the wax is present as an emulsion in an amount in the range of about 0.01 to about 5 parts by weight, preferably about 0.5 parts by weight, of the composition, the biodegradable anionic surfactant is present in an amount in the range of about 0.1 to about 10 parts by weight, preferably about 0.5 parts by weight, of the composition, and the saturated fatty acid is present in an amount in the range of about 0.02 to about 1 parts by weight, preferably about 0.08 parts by weight, of the composition.

High viscosity silicone fluids are clear, colorless polydimethylsiloxane fluids commercially available in kinematic viscosity grades of 5,000 to 2,000,000 centistokes (CSTK) at 25° C. Standard viscosity silicone fluids likewise are clear, colorless polydimethylsiloxane fluids and are commercially available in kinematic viscosity grades of 50 to 1000 CSTK at 25° C.

The water miscible lower aliphatic secondary amines suitable for the present compositions include those containing 2 to 6 carbon atoms, inclusive. Illustrative are dimethylamine, diethylamine, dipropylamine, methylethylamine, methylpropylamine, ethylpropylamine, morpholine, and the like.

Suitable biodegradable anionic surfactants are the N-acylsarcosinates, i.e., amidocarboxylates produced by the reaction of a fatty acid or a rosin acid chloride with sodium sarcosinate. Illustrative, commercially available N-acylsarcosinates are sodium N-lauroylsarcosinate, sodium N-cocoylsarcosinate, sodium N-oleoyl sarcosinate, and the like.

If the present compositions are to be dispensed in the form of an aerosol from a metal can, ammonia is added as ammonium hydroxide to serve as an inhibitor of corrosion. In such cases ammonium hydroxide is present in the composition in an amount in the range of about 0.1 to about 0.2 weight percent, based on the weight of the composition. If the present composition is dispensed from a non-metallic container, ammonium hydroxide can be omitted from the composition.

Preferably the present sprayable compositions have an absolute viscosity in the range of about 1 to about 150 centipoises at 25° C.

An illustrative preferred formulation is shown in Table I below.

TABLE 1

Foam and Shine Composition

| PART | PARTS BY WT. | Wt. % AEROSOL | INGREDIENT |
|---|---|---|---|
| Part 1 | 1 | 0.93 | Deionized water |
| Part 1 | 0.03 | 0.02 | 1,2-Benzoisothiazolin-3-one (Microbiostat) |
| Part 1 | 0.08 | 0.08 | Stearic acid |
| Part 2 | 0.07 | 0.06 | Morpholine |

TABLE 1-continued

Foam and Shine Composition

| PART | PARTS BY WT. | Wt. % AEROSOL | INGREDIENT |
|---|---|---|---|
| Part 3 | 95.62 | 88.93 | Deionized water |
| Part 3 | 0.08 | 0.08 | Silicone 10,000 CSTK @ 25° C. |
| Part 3 | 0.25 | 0.23 | Silicone 350 CSTK @ 25° C. |
| Part 3 | 1.33 | 1.24 | Norpar 12 (Paraffin hydrocarbon fluid) |
| Part 3 | 0.5 | 0.47 | Carnauba wax emulsion (as supplied) |
| Part 3 | q.s. | q.s. | Fragrance |
| Part 3 | 0.07 | 0.06 | Morpholine |
| Part 3 | 0.1 | 0.09 | Sodium nitrite |
| Part 3 | 0.1 | 0.093 | Sodium benzoate |
| Part 4 | 0.17 | 0.15 | Ammonium hydroxide 26° Be/ Aqua Ammonia |
| Part 4 | 0.5 | 0.47 | Sodium lauroyl sarcosinate (as supplied) |
| Part 4 | q.s. | q.s. | Colorant |
|  | 100 | 93 |  |
|  |  | 7 | A-70 (Hydrocarbon propellant blend) |
|  |  | 100 |  | q.s. = quantity sufficient

To prepare the present compositions, the ingredients of Part 1 (deionized water, 1,2-benzothiazolin-3-one and stearic acid) are combined in a heated vessel, heated to a temperature of about 160° F. (89° C.), and held at that temperature for about 10 minutes with stirring until fully melted. Thereafter morpholine (Part 2) is added to Part 1 with stirring and the resulting admixture is permitted to cool. The admixture so produced (Parts 1 and 2) is then combined with the remaining portion of deionized water in a master vessel, stirred for about 30 minutes, and the remaining Part 3 ingredients then added thereto with stirring.

The stirring is continued until the vessel contents are substantially uniform. The ingredients of Part 4 are then added to the master vessel with continued stirring until the obtained product is substantially uniform.

The product, produced as described hereinabove, preferably has a specific gravity of about 0.998, has a bluish green color, exhibits a pH value of about 9.2 and has a solids content of about 1% by weight.

To produce an aerosol spray package, the foregoing product is charged into an aerosol spray can and pressurized to a pressure in the range of about 55 to about 65 pounds per square inch gage (psig) at 70° F. (21° C.).

A foamed product can be dispensed from the aerosol spray package at a rate of about 3 grams per second and produces, at a distance of about 6 inches, a circular foam pattern of about 4 to about 6 inches in diameter.

To wash and wax a car, a light coat of the product is applied to a portion of the car surface to be cleaned, but which is free of caked-on soil, so as to wet the car surface. Thereafter, the wetted region of car surface is wiped with a soft terry cloth towel, turning the towel frequently. A second, clean soft towel is then used to buff the cleaned region to a high gloss shine.

The foregoing is illustrative of the principles of the present invention. Still other variants thereof will readily present themselves to those skilled in the art.

We claim:

1. A sprayable wash-and-wax composition consisting of an aqueous emulsion of saturated fatty acid, a water miscible lower aliphatic secondary amine, a high viscosity silicone fluid, a standard viscosity silicone fluid, a hydrocarbon fluid, a wax, and a surfactant.

2. The sprayable wash-and-wax composition in accordance with claim 1 wherein the lower aliphatic secondary amine in morpholine.

3. The sprayable wash-and-wax composition in accordance with claim 1 wherein the high viscosity silicone fluid has a viscosity of about 10,000 centistokes at 25° C. and the standard viscosity silicone fluid has a viscosity of about 350 centistokes at 25° C.

4. The sprayable wash-and-wax composition in accordance with claim 1 and having a solids content of about 1 percent by weight.

5. A sprayable wash-and-wax composition in a metal aerosol can pressurized with a propellant the composition consisting of an aqueous emulsion of saturated fatty acid, a water miscible lower aliphatic secondary amine, a high viscosity silicone fluid, a standard viscosity silicone fluid, a hydrocarbon fluid, a wax, a surfactant, and about 0.1 to about 0.2 weight percent ammonium hydroxide based on the weight of the composition.

6. The sprayable wash-and-wax composition in accordance with claim 1 wherein the surfactant is sodium lauroyl sarcosinate.

7. The sprayable wash-and-wax composition in accordance with claim 1 wherein the wax is a carnauba wax emulsion.

8. The sprayable wash-and-wax composition in accordance with claim 1 and having an absolute viscosity in the range of about 1 to about 150 centipoises at 25° C.

9. The sprayable wash-and-wax composition in accordance with claim 5 wherein the lower aliphatic secondary amine in morpholine.

10. The sprayable wash-and-wax composition in accordance with claim 5 wherein the high viscosity silicone fluid has a viscosity of about 10,000 centistokes at 25° C. and the standard viscosity silicone fluid has a viscosity of about 350 centistokes at 25° C.

11. The sprayable wash-and-wax composition in accordance with claim 5 and having a solids content of about 1 percent by weight.

12. The sprayable wash-and-wax composition in accordance with claim 5 wherein the surfactant is sodium lauroyl sarcosinate.

13. The sprayable wash-and-wax composition in accordance with claim 5 wherein the wax is a carnauba wax emulsion.

14. The sprayable wash-and-wax composition in accordance with claim 5 and having an absolute viscosity in the range of about 1 about 150 centipoises at 25° C.

* * * * *